United States Patent [19]

Shaw

[11] 4,023,478

[45] May 17, 1977

[54] NUT HUSKING APPARATUS

[76] Inventor: Paul W. Shaw, 215 West Road, Whittier, Calif. 90603

[22] Filed: Aug. 18, 1975

[21] Appl. No.: 605,737

[52] U.S. Cl. .............................................. 99/628
[51] Int. Cl.² ........................................ A23N 7/00
[58] Field of Search ............ 99/628, 627, 623, 618, 99/601, 600; 198/625; 15/1.15

[56] References Cited

UNITED STATES PATENTS

| 190,614 | 5/1877 | Pendleton | 99/618 |
|---------|--------|-----------|--------|
| 220,698 | 10/1879 | Brown | 99/618 |
| 807,551 | 12/1905 | Gordon | 99/628 |
| 1,320,968 | 11/1919 | Baudendistel | 99/628 |
| 1,683,004 | 9/1928 | Voigt | 99/628 |
| 3,077,217 | 2/1963 | Hind | 99/628 |

*Primary Examiner*—Richard E. Aegerter
*Assistant Examiner*—L. Footland
*Attorney, Agent, or Firm*—J. C. Baisch

[57] ABSTRACT

An apparatus for husking nuts, in a continuous manner without causing damage to the shell and the kernels thereof, the apparatus having a conveyor drum which includes double-spiraled, transporting rib members radially arranged about the conveyor drum, whereby the nuts received therein are forced progressively in a twisting action against a stationary plate member and a plurality of spring-biased, husking fingers, at which time, the husk material is thereby separated from the shell of the nut and allowed to discharge between the drum and stationary plate member, while the remaining nut shell, together with the kernel therein, is transported to be discharged separately at one end of the apparatus.

2 Claims, 5 Drawing Figures

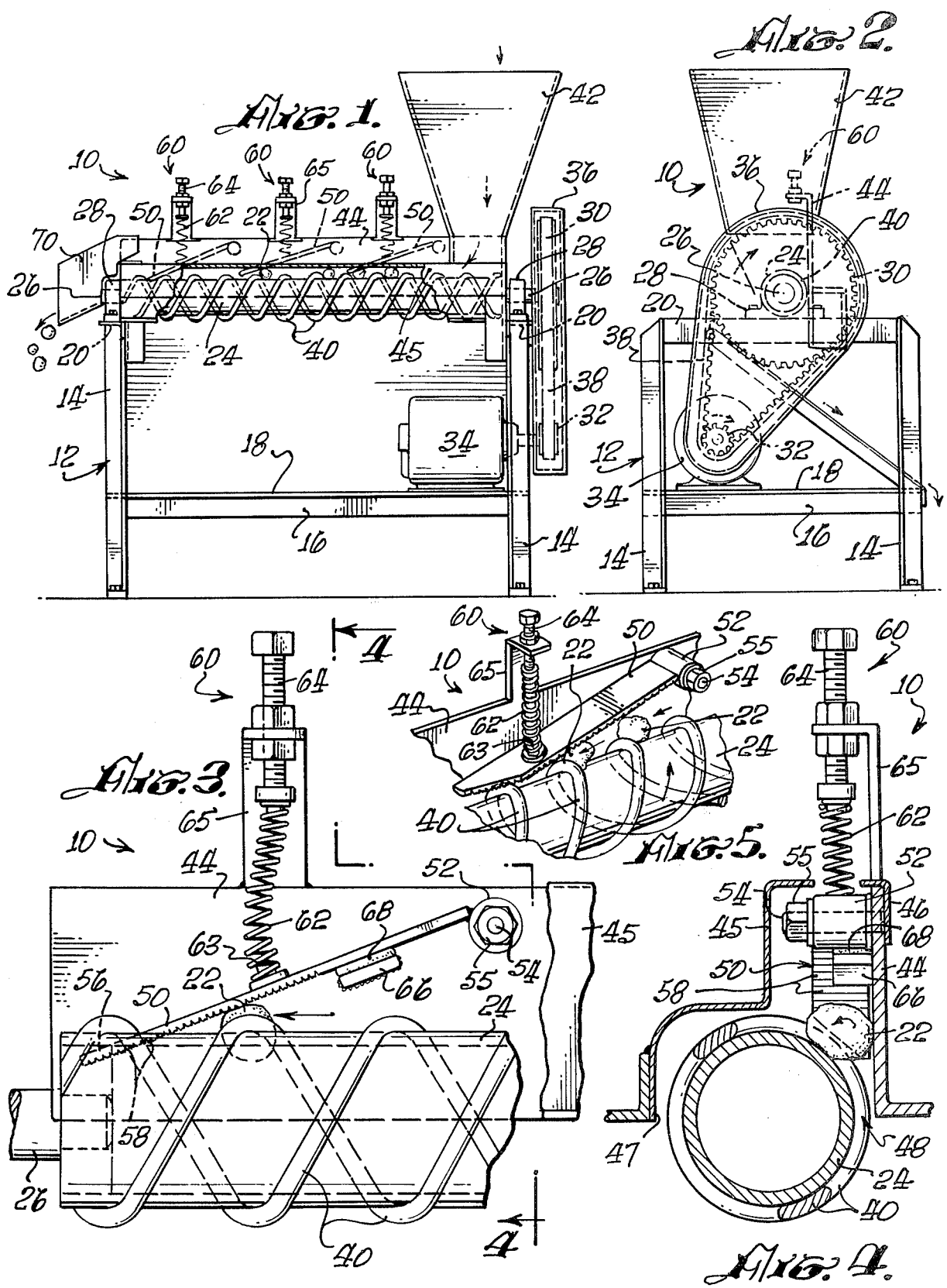

NUT HUSKING APPARATUS

BACKGROUND OF THE INVENTION

1. Field of the Invention

The invention relates generally to a machine or apparatus for removing the husks from nuts, and relates more particularly to an apparatus that provides a continuous-husking procedure for various sized nuts, whereby the nut shell thereof is not cracked and the meat of the nut is not damaged.

2. Description of the Prior Art

As is well known in the art, various problems and difficulties are encountered in removing the thick, protective husk from the nut shell without causing damage to the shell and possibly to the meat disposed therein. Various types of apparatuses and methods have been proposed, but, these are either very time consuming or they do not completely provide a damage-free husked nut. Thus, the commercial value is very often lost. Again, additional time is lost in many husking processes due to the fact that the nuts must first be classified and then sorted into various sized groups.

However, with the herein-disclosed apparatus, the above problems have been eliminated.

SUMMARY OF THE INVENTION

The present invention comprises a suitable support stand having an elongated, fixed plate secured thereto, wherein the face of the plate is arranged in a vertical position and juxtaposed along the full lenght of a conveyor drum, the drum being rotatably mounted at its free ends to the support stand. Peripherally disposed about the conveyor drum are a plurality of spiraled, continuous ribs which provide a means for transporting the nut to be husked from one end of the apparatus to the other once the nut is received within the apparatus.

Accordingly, there is provided a hopper in which all sizes of nuts are accepted; and from this hopper the nuts are allowed to engage the conveyor drum, which rotates in a clockwise direction, thereby forcing the husk of the nut between the drum and the vertical plate. Thus, as the drum rotates, the nut is forced progressively forward against the wall in a twisting action created by the various sections of the spiraled ribs. During the forward movement of the nut, it also engages a plurality of husking fingers. These fingers are spring loaded and biased downwardly against the nuts as they pass to the discharge end thereof. Each finger is provided with an under surface having numerous serrations similar to those of a wood file. Hence, it can be seen that forward progressive movement of the twisting nut against the serrated fingers provides a means for removing the husk from each individual nut, leaving the meat clean and undamaged.

As the husk is removed, it then falls between the vertical, stationary plate and the conveyor drum and is deposited on a husk-slide member. The nut shell is continuously transported along the entire length of the drum and then discharged at the far end of the apparatus, the nut being larger than the space between the drum and the stationary wall member.

OBJECTS AND ADVANTAGES OF THE INVENTION

The present invention has, for an important object, a provision wherein a large quantity of nuts, of various sizes, can be processed for removing the husk surrounding the shell without causing damage thereto.

It is another object of the invention to provide a nut-huskin apparatus wherein the apparatus is so designed that the miscellaneous nut sizes so not have to be sorted in specific sized groups before being disposed therein for husking.

It is still another object of the present invention to provide a nut-husking apparatus having few operating parts.

It is a further object of the invention to provide a nut-husking apparatus that is easy to service and maintain.

It is still a further object of the invention to provide an apparatus of this character that is relatively inexpensive to manufacture.

Still another object of the invention is to provide an apparatus of this character that is simple to operate and rugged in construction.

The characteristics and advantages of the invention are further sufficiently referred to in connection with the following detailed description of the accompanying drawings which represent one embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only:

FIG. 1 is a front elevational view of the apparatus embodying the invention wherein portions thereof are broken away to show the interior mechanism thereof;

FIG. 2 is a side-elevational view thereof;

FIG. 3 is an enlarged, fragmentary view of the apparatus wherein the husking finger is seen engaging the nut for removing the husk therefrom;

FIG. 4 is a cross-sectional view taken substantially along line 4—4 of FIG. 3 thereof; and FIG. 5 is a fragmentary perspective view of a portion of the present invention.

DESCRIPTION OF THE PREFERRED EMBODIMENT

Referring more particularly to the accompanying drawings, there is shown an apparatus for removing husk material from nuts, said apparatus embodying the present invention being generally indicated at 10. Said nuthusking apparatus comprises a basic support stand, generally designated at 12. The support stand structure can be constructed in any suitable manner, but, is herein shown as having a plurality of upright legs 14, wherein the legs are rigidly interconnected by cross bars 16 arranged adjacent the lower portion of legs 14. Said bars 16 provide a means to support a platform 18 or support structure. A second group of support bars 20 are secured to each respective leg 16 at the uppermost ends thereof, as seen in FIGS. 1 and 2.

Rotatably mounted to said structure 12 is a conveyor means for conveying the husk-covered nuts 22 from the receiving end of the apparatus to the discharge end thereof, which will hereinafter be described in detail. The nut-conveying means or conveyor means comprises a cylindrical, conveyor-drum member or conveyor drum 24 having secured to each end thereof a shaft 26, each shaft 26 being journaled in respective bearings 28 affixed to each end-positioned bar 20. At least one of said shafts 26 extends outwardly from said bearing 28 and is adapted to receive an enlarged sprocket gear 30, said gear 30 being a part of a drive means which includes a reduced diameter gear 32 secured to the shaft of motor 34. The motor 34 is mounted and supported on platform 18, as indicated in FIGS. 1 and 2.

For safety reasons, a safety cover 36 is disposed over the gears 30 and 32, and drive belt 38, which operably connects said gears 30 and 32.

Accordingly, the conveyor drum 24 is rotated by said drive means as shown. However, included as part of the drum 24 is a plurality of continuously arranged, spiral ribs 40, which are formed by welding a pair of 5/16 round rods to the peripheral surface of the drum, whereby a screw-like conveyor is provided as the drum rotates by the drive means. It should be noted that one of more rods can be mounted to the drum; however, it has been found that the best results occur with just two rods being affixed in a convoluted manner about the peripheral surface of the drum at approximately a 60° deg. angle to the longitudinal axis of the drum. A greater angle or a smaller angle at which the rods are positioned will not give the optimum results; that is, a greater angle will create less pressure on the nuts and a smaller angle will create greater pressure. Hence, with a greater angle the pressure on the nuts may not be enough to husk the nuts, while smaller angle will cause a pressure or force so great as to crack or damage the nuts. The husk-covered nuts are first dropped into a hopper means 42, which is mounted to the support stand 12 just above the forward end of the conveyor drum 24, as seen in FIG. 1. The husk-covered nuts are then fed directly onto the conveyor 24 as the drum rotates. The clockwise rotation of the conveyor drum forces the nut 22 to press against the vertical side wall 44 formed from an angle strip which is secured in a stationary manner to the support stand 12 also termed herein a stationary plate or wall member. At this time, the nuts being fed into the apparatus are not only forced against the wall 44 in a rotating action, but, are also forced along the wall in a progressively forward motion due to the spiraled ribs 40 thus causing each covered nut to twist and tumble as it moves along the wall surface. This action provides a means to remove the soft husk material from the shell. It is contemplated that the wall surface can be provided with a rough surface to aid the husk material.

To insure that each nut being processed is kept within the husk removing area, as seen in FIG. 4, there is included a cover 45, which is so arranged as to prevent the nuts 22 from being ejected from the machine. That is, the cover is affixed along side 46 to wall 44 while the opposite side 47 of the cover is secured to one of the support bars 20. Hence, the nuts therein are prevented from being agitated and thrown out of the apparatus before all the husk material is removed therefrom.

The space indicated at 48, between the conveyor drum 40 and the lower edge 49 of wall 44, has a width of less than one-half inch. Due to the fact that the shells are generally sized between one-half inch and 1 ½, no husked nut can be lost by dropping through space 48. Thus, only the husk being removed from the shell is allowed to drop therethrough and discharge onto a sloping sheet, from which the husk slides, to a waste pile (not shown). Said sheet also prevents the husk material and the dust therefrom from covering the motor 34.

In addition, the apparatus includes huskremoving means in the form of a plurality of elongated huskremoving fingers 50, each finger being separately mounted to wall 44 in a pivoted manner. The upper end of each finger 50 is affixed to a support bushing 52, which is adapted to be received on and rotated about a stud 54, said stud being threaded to receive nut 55.

In order to provide direct engagement with each passing nut 22, the fingers 50 are made with a beveled lower end 56, thereby allowing said fingers to fit within space 48, as seen in FIGS. 3, 4 and 5. This then allows for each nut, regardless of size, to come into direct contact with lateral serrations 58 disposed on the under surface of each finger 50. The fingers are biased downwardly by a biasing means, generally indicated at 60, which comprises a coil spring 62 attached to each of said fingers by a fixed pin 63 secured to the back surface of said finger and adapted to be connected to an a soring tension adjusting means adjusting bolt 64. The adjusted bolt 64 is mounted to a side bracket 65 and is arranged to be selectively positioned to provide the proper spring tension to each finger, whereby the fingers can be adjusted to engage a particular type of nut under the required pressure to remove the husk therefrom.

Accordingly, the downward-biasing force of spring 62 positions the finger between the drum 24 and the wall 44. However, the finger must be limited in its downward movement so as not to actually contact the drum. Therefore, a stop means is provided to stop the finger. This stop means comprises an arm member 66 affixed to wall 44, said arm including a rubber stop pad 68 for the finger to rest thereon.

Thus, as the nut passes the last finger of the apparatus the husk material is completely removed from the shell, and the shell is then discharged from the discharge chute 70.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:
1. A nut-husking apparatus comprising:
a support structure;
a rotatble conveyor means operably mounted to said support structure;
a drive means operably connected to said conveyor means, whereby nuts disposed thereon are transported from one end of said apparatus to the other;
a stationary wall member longitudinally disposed along the length of said conveyor means whereby a predetermined space is formed therebetween and wherein said nuts being husked are agitated therein;
a plurality of husk-removing means mounted to said stationary wall and positioned for direct engagement with said nuts as said nuts are transported by said conveyor means;

said rotatable conveyor means comprises an elongated, cylindrical drum;

at least one spiraled rib member affixed to the peripheral surface of said drum;

said husk-removing means comprises an elongated finger movably attached to said stationary wall and formed to have a free end portion thereof disposed in said predetermined space between said wall and said drum;

a plurality of serrations arranged on one surface of said finger for removal of said husk from said nut; and biasing means mounted to each of said fingers, whereby said fingers engage said nuts in a positive, continuous manner;

said apparatus includes a fixed cover to allow the nuts therein to move in a longitudinal direction from one end of said apparatus to the other;

said apparatus includes a hopper means mounted at the receiving end of said conveyor drum;

a discharge chute positioned at the the discharge end, whereby the nuts are discharged therefrom;

a slide member arranged below said conveyor drum, whereby the removed husk material falls thereon after passing through said predetermined space between said drum and said wall thereof;

a pair of ribs are seamed to the peripheral surface of said conveyor drum in a convoluted arrangement; and said convolutions of said ribs are arranged having an approximate pitch of 60° relative to the longitudinal axis of said drum.

2. The apparatus as recited in claim 1, wherein said biasing means of said fingers comprises:

a spring-tension adjusting means mounted to said stationary wall member;

a coil spring disposed between said adjusting means and said fingers, whereby proper tension can be applied to said nuts for removal of said husk therefrom; and stop means positioned below each of said fingers, whereby the downward movement of said fingers is limited.

* * * * *